Patented July 23, 1940

2,209,198

UNITED STATES PATENT OFFICE 2,209,198

NAPHTHENIC ACID-MODIFIED ALKYD RESIN

Per K. Frolich, Westfield, N. J., assignor to Standard Oil Development Company, a corporation of Delaware No Drawing. Application October 27, 1936,
Serial No. 107,800

4 Claims. (Cl. 260—76)

This invention deals with the preparation of resinous compounds containing naphthenate groups. More specifically, it deals with the modification of various organic resins with naphthenic compounds, such as those produced from petroleum oils, to give distinctive and superior properties to such resins.

At the present time the greatest source of naphthenic acids is from petroleum. These naturally occurring materials, which are preferred over other naphthenic acids such as those of the synthetic type, are generally recovered in a crude state by fractionally distilling the crude oil and neutralizing the fractions which take overhead most of the acids, such fractions being generally the kerosene, gas oil and light lubricating oil cuts. The soaps so produced are then treated with sulfuric acid and the naphthenic acids are recovered by distillation. A number of crude oils, such as those from California, Colombia and Rumania may contain upward of 2% or even more such acids in selected fractions.

A sample of naphehtenic acids recovered in this manner from Colombia crude gas oil fraction has the following properties:

Gravity (A. P. I.) _____ 13.4.
Flash _____ 270° F.
Neutralization value _____ 186 mg. KOH/G.
Saponification value _____ 188 mg. KOH/G.
Water _____ about 1%.
Unsaponifiable matter _____ 6.5% (mostly oil).
Ash _____ 1.75%.

A sample of such acids having an acid number of about 225 was fractionated at 5 mm. pressure and saponification values on the fractions were obtained.

| Fraction | Saponification No. |
|---|---|
| 90–185° C | 183 |
| 185–195° C | 247 |
| 195–210° C | 249 |
| 210–220° C | 253 |
| 220–233° C | 241 |
| 233–248° C | 212 |
| 248° C. up | 145 |

The crude mixture possessses a distinctive odor which may be practically completely removed by partial hydrogenation. Either the crude or purified acids or their fractions may be employed for the purposes of this invention.

The acids heretofore described may be hydrogenated to give aldehydes or alcohols, and such compounds are likewise employed in the invention according to the method which will be substantially set forth.

The naphthenic acids are of value in preparing modified alkyd resins having distinctive properties. For instance, one molecule of glycerol may be esterified with one molecule of naphthenic acids, and the remaining two hydroxy groups in the glycerol may be reacted with maleic, adipic, succinic, phthalic, or other dibasic acid. In the case of phthalic acid or anhydride, a semi-solid thick resin is obtained which is highly suitable as a plasticizer for cellulose esters or ethers, alkyd resins, and the like. Harder resins may be prepared from maleic anhydride, using less (¼ to ½ mol.) of naphthenic acids. In many cases it is advantageous to react the remainder of the molecule of the polyhydric compound with a drying acid such as linoleic, linolenic, licanic, ricinoleic, or other fatty drying acids, fossil resins, or even a non-drying fatty acid or with both a drying acid and a polybasic acid.

Another valuable use for naphthenic acids in this field is as a modifier for the usual water soluble dibasic acids which have been heretofore considered unsuitable for the preparation of alkyd resins. For example, malic, tartaric or citric acid may be esterified with naphthenic acids or their anhydrides, either partially or completely, and the products so formed may then be reacted with a polyhydroxy compound such as glycerol or glycol. In the case of glycerol, polyglycerols or polyglycols, one or more of the hydroxy groups may be esterified with naphthenic acids prior to resinification.

It is to be understood that the term "naphthenic acid" is to be construed as covering both the acids and the anhydrides, although the latter are preferable. Such anhydrides are most conveniently prepared by bubbling ketene through the acids, heating the complex formed, and distilling off acetic anhydride, leaving naphthenic anhydrides as bottoms.

Naphthenic vinyl resins having distinctive properties may also be prepared by esterifying polyvinyl alcohol with naphthenic acid anhydride. Such resins possess much higher oil solubility than the usual vinyl resins.

Another class of resins which may be improved by naphthenic compounds are those of the Diels-Alder type of resin by reaction of diolefins or cracked gasolines with maleic acid. Such products may be esterified with glycerol mononaphthenate to give highly desirable resinous products.

The naphthenic alcohols find value in the preparation of modified acrylic or methacrylic ester polymers. The usual method for producing the modified acrylic ester polymers is to react ethylene chlorhydrin with sodium cyanide thereby obtaining the cyanhydrin which is dehydrated and hydrolyzed to the acid that may be esterified with naphthenic alcohol to give a naphthenic acrylate which may then be polymerized by heating with a catalyst such as benzoyl peroxide. Highly oil-soluble solid resins are thus produced. Methacrylate resins may be prepared in a similar manner from acetone cyanhydrin as a raw material.

The naphthenic aldehydes produced by hydrogenation of naphethenic acids are of value in the preparation of the phenol-aldehyde type resins. For example, phenol, or alkylated or otherwise modified phenols, may be condensed in presence of a condensing agent with naphthenic aldehyde to produce solid moldable resins which have superior water resistant properties.

The above examples are merely illustrative of the many forms of naphthenic resins which may be prepared. Such products may be admixed with other resins or fillers, pigments, inhibitors, dyes, plasticizers, plastics, rubbers, and the like. The intention here is not to limit the invention to the examples given nor to the reaction mechanism, but only to the following claims which are drawn up as broadly as the prior art permits.

I claim:

1. Composition of matter comprising an alkyd resin produced by reacting not more than one mol. of naphthenic acid from petroleum with one mol. of a polyhydric aliphatic compound having more than two hydroxyl groups, and one mol. of a dicarboxylic organic acid.

2. Method of producing a modified alkyd resin comprising reacting a polyhydroxy aliphatic alcohol containing more than two hydroxyl groups with not more than one mol. of a petroleum naphthenic acid until esterification is substantially complete, then reacting the resulting compound with a polycarboxylic organic acid until substantially complete esterification is obtained.

3. Method of producing a modified alkyd resin comprising reacting a polyhydroxy aliphatic alcohol containing more than two hydroxyl groups with less than one mol. of a petroleum naphthenic acid until esterification is substantially complete, reacting the resulting compound with an organic drying acid to esterify the hydroxy compound incompletely so as to leave at least two unreacted hydroxyl groups per molecule, and completing the esterification of the hydroxy compound to resinification with a polycarboxylic organic acid.

4. Method of producing a modified alkyd resin comprising reacting one mol of glycerol with one mol of a petroleum naphthenic acid fraction having a saponification value in the range of about 145 to 253 to esterify one hydroxy group in the glycerol, then reacting the resulting compound with a dibasic organic carboxylic acid under resinifying conditions to convert the partially esterified glycerol into a resin of at least plastic consistency.

PER K. FROLICH.